United States Patent
Kurihara et al.

(10) Patent No.: US 9,367,326 B2
(45) Date of Patent: Jun. 14, 2016

(54) MULTIPROCESSOR SYSTEM AND TASK ALLOCATION METHOD

(71) Applicant: FUJITSU LIMITED, Kawasaki-shi, Kanagawa (JP)

(72) Inventors: Koji Kurihara, Kawasaki (JP); Koichiro Yamashita, Hachioji (JP); Hiromasa Yamauchi, Kawasaki (JP); Takahisa Suzuki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 573 days.

(21) Appl. No.: 13/718,694

(22) Filed: Dec. 18, 2012

(65) Prior Publication Data

US 2013/0185521 A1    Jul. 18, 2013

Related U.S. Application Data

(63) Continuation of application No. PCT/JP2010/060913, filed on Jun. 25, 2010.

(51) Int. Cl.
| | |
|---|---|
| *G06F 9/46* | (2006.01) |
| *G06F 9/38* | (2006.01) |
| *G06F 9/50* | (2006.01) |
| *G06F 12/08* | (2016.01) |

(52) U.S. Cl.
CPC ............ *G06F 9/3877* (2013.01); *G06F 9/5027* (2013.01); *G06F 12/0831* (2013.01); *G06F 2209/503* (2013.01); *G06F 2209/509* (2013.01)

(58) Field of Classification Search
None
See application file for complete search history.

(56) References Cited

U.S. PATENT DOCUMENTS

| | | | | |
|---|---|---|---|---|
| 4,099,236 A | * | 7/1978 | Goodman et al. | 710/110 |
| 6,272,602 B1 | * | 8/2001 | Singhal et al. | 711/144 |
| 6,389,446 B1 | * | 5/2002 | Torii | 718/100 |
| 8,381,212 B2 | * | 2/2013 | Brelsford et al. | 718/100 |
| 2003/0208643 A1 | * | 11/2003 | Ferguson | G06F 3/023 710/15 |
| 2009/0254739 A1 | | 10/2009 | Takada | |

FOREIGN PATENT DOCUMENTS

| | | |
|---|---|---|
| JP | 63-208154 A | 8/1988 |
| JP | 64-013864 A | 1/1989 |
| JP | 05-189390 A | 7/1993 |
| JP | 06-139209 A | 5/1994 |
| JP | 07-141302 A | 6/1995 |
| JP | 11-120147 A | 4/1999 |
| JP | 11-195007 A | 7/1999 |
| JP | 2009-251997 A | 10/2009 |

* cited by examiner

*Primary Examiner* — Mengyao Zhe
(74) *Attorney, Agent, or Firm* — Arent Fox LLP

(57) ABSTRACT

A multiprocessor system includes a master processor, at least one slave processor, and a synchronization unit. The master processor has a first flag indicating whether the master processor is in a task activation accepting state and a second flag reflective of a flag of a slave processor, iteratively updates the first flag at a frequency based on the volume of tasks processed by the master processor, and activates a task on the master processor or the slave processor based on the first flag and the second flag. Each slave processor has a third flag indicating whether the slave processor is in the task activation accepting state and iteratively updates the third flag at a frequency based on the volume of tasks processed by the slave processor. Tasks are allocated to the slave processor by the master processor. The synchronization unit synchronizes the third flag and the second flag.

9 Claims, 4 Drawing Sheets

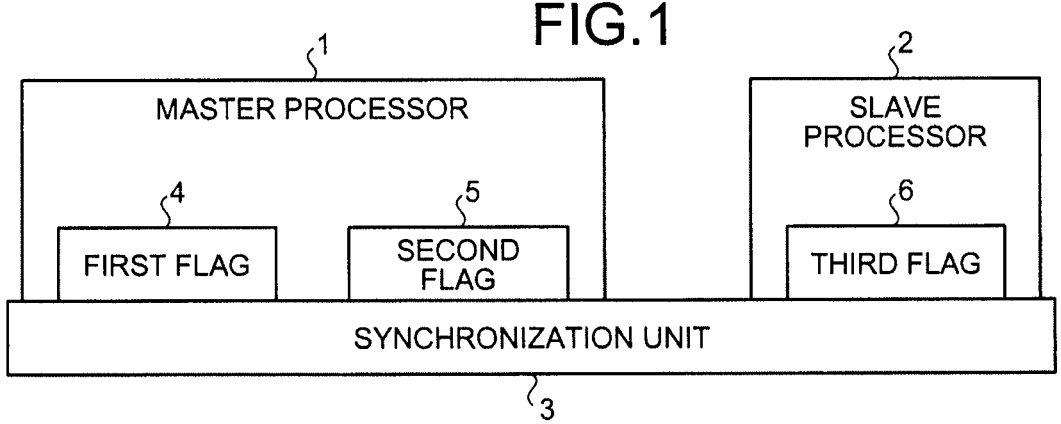
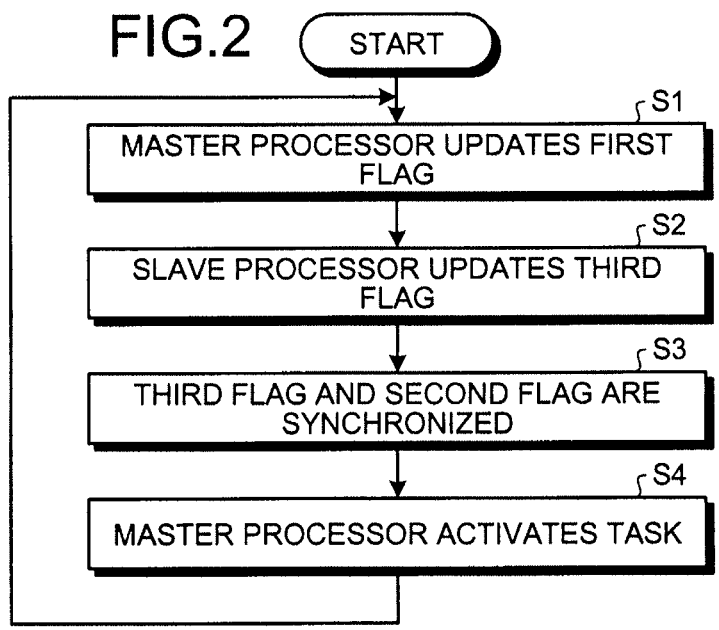

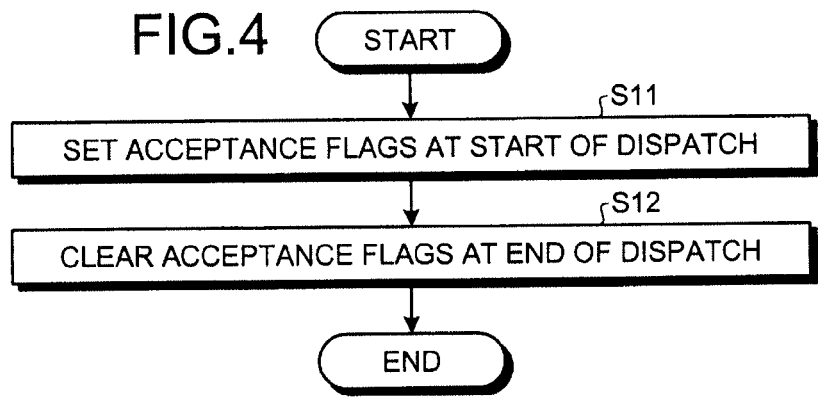
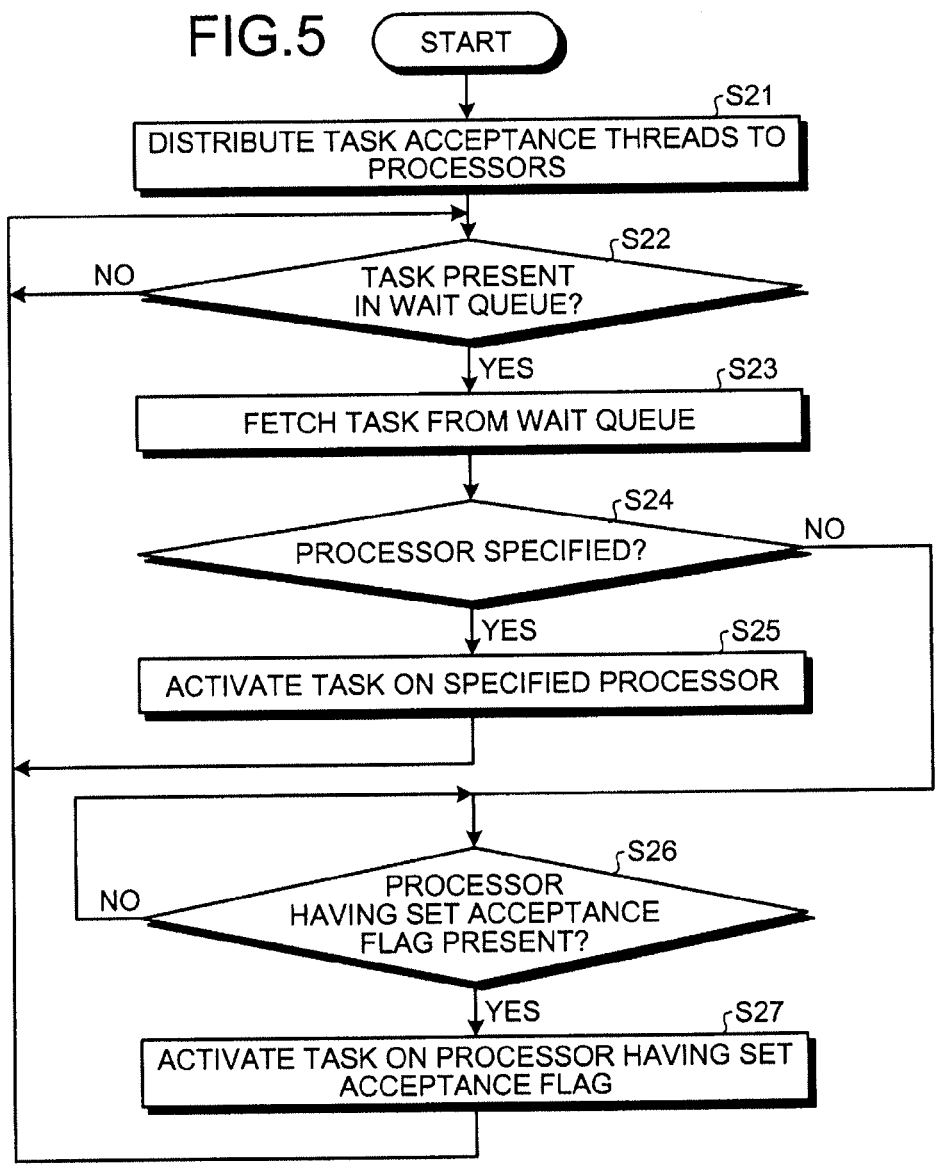

MULTIPROCESSOR SYSTEM AND TASK ALLOCATION METHOD

CROSS REFERENCE TO RELATED APPLICATIONS

This application is a continuation application of International Application PCT/JP2010/060913, filed on Jun. 25, 2010 and designating the U.S., the entire contents of which are incorporated herein by reference.

FIELD

The embodiments discussed herein are related to a multiprocessor system and scheduling method.

BACKGROUND

A multiprocessor scheduling method is conventionally known that shares load information among plural processors so that a processor having the least load executes a process. A multiprocessor system is also known that prepares management information indicating correspondence between functions provided by the operating system and processors executing the functions so that task processes are distributed to the processors based on the management information. A multiprocessor system is also known that provides information concerning a process from a processor handling execution of the process to processors that are to be requested to execute the process so as to determine a processor to execute the process based on the information. A multiprocessor scheduling method is also known that allocates tasks to the processors based on processor information previously specified in a program by the user.

For examples of such conventional technologies, refer to Japanese Laid-Open Patent Publication Nos. H5-189390, H6-139209, S64-13664, and S63-208154.

However, in the case where tasks are dynamically allocated to the processors to balance the load in the conventional multiprocessor system, each of the processors calculates load information and notifies the processor performing the task allocation of the load information by way of inter-processor communication. For this reason, overhead increases when performing dynamic task allocation and more time is required for allocating tasks, resulting disadvantageously in a reduction of the throughput in the multiprocessor system.

SUMMARY

According to an aspect of an embodiment, a multiprocessor system includes a master processor having a first flag indicating whether the master processor is in a task activation accepting state and a second flag reflective of the state of a flag of a slave processor, the master processor iteratively updating the state of the first flag at a frequency based on the volume of tasks processed by the master processor, the master processor activating a task on the master processor or the slave processor based on the states of the first flag and the second flag; at least one slave processor having a third flag indicating whether the slave processor is in the task activation accepting state, the slave processor iteratively updating the state of the third flag at a frequency based on the volume of tasks processed by the slave processor, the tasks being allocated to the slave processor by the master processor; and a synchronization unit that synchronizes the state of the third flag and the state of the second flag.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 is a block diagram of a multiprocessor system according to a first embodiment;

FIG. 2 is a flowchart of a scheduling method according to the first embodiment;

FIG. 4 is a flowchart of processing by a task acceptance thread in the multiprocessor system according to the second embodiment;

FIG. 5 is a flowchart of the scheduling method according to the second embodiment.

DESCRIPTION OF EMBODIMENTS

Figure 3:
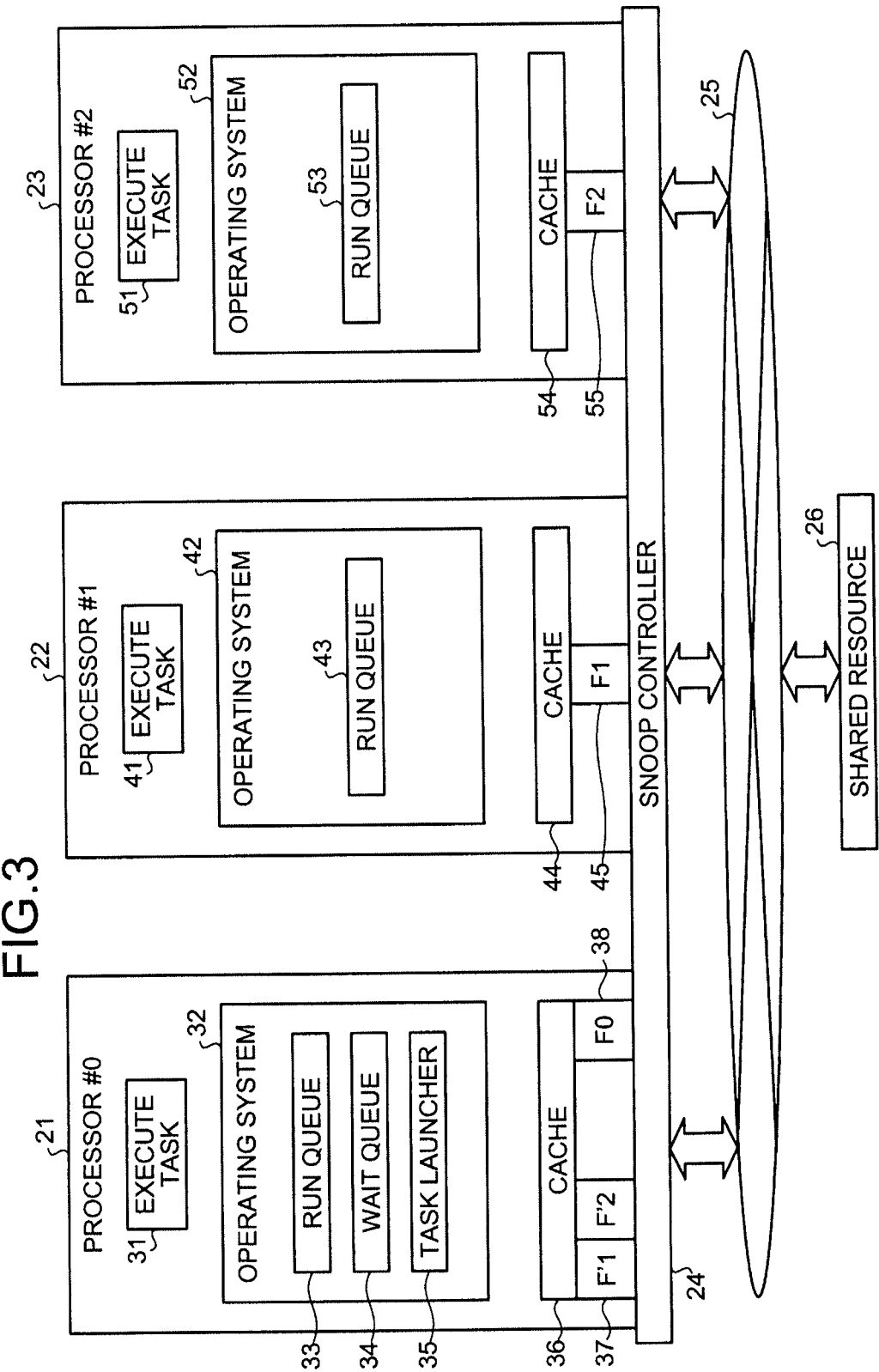
FIG. 3 is a block diagram of the multiprocessor system according to a second embodiment.

Embodiments of a multiprocessor system and a scheduling method according to the present invention will be described in detail with reference to the accompanying drawings. In the following embodiments of the multiprocessor system, each of the processors has a flag indicating whether to accept task activation and a master processor has a flag synchronized with the flag so that the master processor causes each processor to activate a task based on the flag. The present invention is not limited by the embodiment.

FIG. 1 is a block diagram of a multiprocessor system according to a first embodiment. As depicted in FIG. 1, the multiprocessor system includes a master processor 1, at least one slave processor 2, and a synchronization unit 3.

The master processor 1 has a first flag 4 and a second flag 5. The first flag 4 indicates whether the master processor 1 is in a task activation accepting state. At a frequency based on the volume of tasks processed by the master processor 1, the master processor 1 iteratively updates the state of the first flag 4 between the task activation accepting state and non-accepting state. The second flag 5 reflects the state of a third flag 6 of the slave processor 2.

The slave processor 2 has the third flag 6. The third flag 6 indicates whether the slave processor 2 is in the task activation accepting state. At a frequency based on the volume of tasks processed by the slave processor 2, the slave processor 2 iteratively updates the state of the third flag 6 between the task activation accepting state and non-accepting state.

The synchronization unit 3 synchronizes the state of the third flag 6 with the state of the second flag 5. The synchronization between the flags is performed by the synchronization unit 3 without using inter-processor communication. For all the processors 1 and 2, the master processor 1 activates a task based on the state of the first flag 4 and the state of the second flag 5. In other words, the master processor 1 allocates tasks to the master processor 1 or the slave processor 2 based on the state of the first flag 4 and the state of the third flag 6 reflected at the second flag 5.

FIG. 2 is a flowchart of a scheduling method according to the first embodiment. As depicted in FIG. 2, when the task activation process is started, the state of the first flag 4 is iteratively updated in the master processor 1 at a frequency based on the volume of tasks processed by the master processor (step S1).

The state of the third flag 6 is iteratively updated in the slave processor 2 at a frequency based on the volume of tasks processed by the slave processor (step S2). When the state of the third flag 6 is updated, the third flag 6 and the second flag 5 are synchronized with each other by the synchronization unit 3 (step S3). As a result, the state of the third flag 6 is reflected on the state of the second flag 5.

The master processor 1 refers to the state of the first flag 4 and the state of the second flag 5 to identify a processor that is in the task activation accepting state, and activates a task for the processor that is in the task activation accepting state (step S4). The procedure then returns to step S1 to iterate the processes of the steps S1 to S4 until no tasks to be activated remain.

Although in FIG. 2 the steps are depicted so as to be sequentially performed, this is due to the fact that flowchart is represented in sequence. In fact, there is no dependence among updating the first flag 4 by the master processor 1, updating the third flag 3 by the slave processor 2 to reflect the updating on the second flag 5, and activating a task in each processor by the master processor 1. Accordingly, step S4 may occur after the step S1 or step S4 may occur after steps S2 and S3. Otherwise, step S1 may occur in succession or steps S2 and S3 may occur in succession.

According to the first embodiment, the state of the second flag 5 reflects whether the slave processor 2 is in the task activation accepting state and consequently, the master processor 1 can activate a task for a processor that is in the task activation accepting state without the slave processor 2 notifying the master processor 1 of load information through inter-processor communication. Thus, there is no overhead when tasks are allocated, thereby suppressing reductions in throughput.

According to the first embodiment, the processors 1 and 2 are put in the task activation accepting state at frequencies based on the amounts of task processed by the processors respectively, therefore, if the volume of tasks respectively processed by the processors increases, the frequency at which the processors are in the task activation accepting state is reduced. This results in a lower task allocation probability. On the other hand, if the volume of tasks processed by the processors respectively decreases, the frequency at which the processors are in the task activation accepting state is increased, resulting in a higher task allocation probability. Thus, the load of the processors is substantially equivalent, and similarly for two or more slave processors.

FIG. 3 is a block diagram of the multiprocessor system according to a second embodiment. As depicted in FIG. 3, the multiprocessor system includes a processor #0_21 acting as the master processor, processors #1_22 and #2_23 acting as, e.g., two slave processors although not specifically limited hereto, and a snoop controller 24 acting as the synchronization unit. The processors (#0, #1, and #2) 21 to 23 can access a shared resource 26 such as memory by way of a bus network 25. Parallel processing is performed by the processors (#0, #1, and #2) 21 to 23.

An operating system 32 operates in the processor #0_21. An execute task 31 is executed on the operating system 32. A run queue 33, a wait queue 34, and a task launcher 35 are implemented by the operating system 32. The wait queue 34 retains a task that is ready for execution and whose execution processor is not determined. The task launcher 35 fetches a task from the wait queue 34 and allocates the fetched task to the processors (#0, #1, and #2) 21 to 23. The task launcher 35 distributes a task acceptance thread described hereinafter to the processors (#0, #1, and #2) 21 to 23. The run queue 33 retains the task and the task acceptance thread allocated by the task launcher 35 until execution is resumed by a task switch.

The processor #0_21 includes a cache 36. An address space of the cache 36 has an acceptance flag F0_38 serving as a first flag and this region is locked so that the address space of the acceptance flag F0_38 lies on the cache 36 at all times. The acceptance flag F0_38 is set or cleared by the processor #0_21 executing the task acceptance thread as the execute task 31. The acceptance flag F0_38 is set when the processor #0_21 is in the task activation accepting state, whereas the acceptance flag F0_38 is cleared when the processor #0_21 is in the task activation non-accepting state.

An operating system 42 operates in the processor #1_22. An execute task 41 is executed on the operating system 42. A run queue 43 is implemented by the operating system 42. The processor #1_22 includes a cache 44. An address space of the cache 44 has an acceptance flag F1_45 as a third flag that is set or cleared by the processor #1_22 executing the task acceptance thread, and this region is locked so that the address space of the acceptance flag F1_45 lies on the cache 44 at all times. The acceptance flag F1_45 is set when the processor #1_22 is in the task activation accepting state, whereas the acceptance flag F1_45 is cleared when the processor #1_22 is in the task activation non-accepting state.

An operating system 52 operates in the processor #2_23. An execute task 51 is executed on the operating system 52. A run queue 53 is implemented by the operating system 52. The processor #2_23 includes a cache 54. An address space of the cache 54 has an acceptance flag F2_55 as the third flag that is set or cleared by the processor #2_23 executing the task acceptance thread, and this region is locked so that the address space of the acceptance flag F2_55 lies on the cache 54 at all times. The acceptance flag F2_55 is set when the processor #2_23 is in the task activation accepting state, whereas the acceptance flag F2_55 is cleared when the processor #2_23 is in the task activation non-accepting state.

The address space of the cache 36 of the processor #0_21 has acceptance flags (F'1 and F'2) 37 serving as second flags, and this region is locked so that the address space of the acceptance flags 37 lies on the cache 36 at all times. The acceptance flags 37 include flags F'1 and F'2. The acceptance flag F'1 corresponds to the acceptance flag F1_45 of the processor #1_22. The acceptance flag F'2 corresponds to the acceptance flag F2_55 of the processor #2_23.

The snoop controller 24 is disposed in the processors (#0, #1, and #2) 21 to 23 between the caches 36, 44, and 54 and an intra-processor bus. The snoop controller 24 can transfer data among the caches 36, 44, and 54 without using the intra-processor bus of the processors (#0, #1, and #2) 21 to 23. The snoop controller 24 allows the acceptance flags (F'1 and F'2) 37 to be synchronized with and in the same state at all times as the acceptance flag F1_45 of the processor #1_22 and the acceptance flag F2_55 of the processor #2_23, respectively. The snoop controller 24 is composed of hardware for example.

FIG. 4 is a flowchart of processing by the task acceptance thread in the multiprocessor system according to the second embodiment. As depicted in FIG. 4, when a task acceptance thread is dispatched, the task acceptance thread sets the acceptance flags (F0, F1, and F2) 38, 45, and 55 of the dispatched processors at the start of the dispatch (step S11). At the end of the dispatch, e.g. immediately before the end of the dispatch, the task acceptance thread clears the acceptance flags (F0, F1, and F2) 38, 45, and 55 set at the start of the dispatch (step S12), and the processing by the task acceptance thread comes to an end.

The processing by the task acceptance thread depicted in FIG. 4 is performed each time the task acceptance thread is dispatched in the processors (#0, #1, and #2) 21 to 23. The processing (steps S11 and S12) to set and clear the acceptance flag performed by a single dispatch is completed within a dispatch cycle set by the operating system.

In the initial state, the run queues 33, 43, and 53 of the processors (#0, #1, and #2) 21 to 23 are empty. The acceptance flags (F0, F1, and F2) 38, 45, and 55 are not set and the acceptance flags (F'1 and F'2) 37 corresponding to the processors 22 and 23 (#1 and #2) are not set.

FIG. 5 is a flowchart of the scheduling method according to the second embodiment. As depicted in FIG. 5, when task activation processing is started, tasks ready for execution are placed in the wait queue 34. First, the task launcher 35 distributes task acceptance threads to the processors (#0, #1, and #2) 21 to 23 (step S21). As a result, the task acceptance threads are stored one by one in the run queues 33, 43, and 53 of the processors (#0, #1, and #2) 21 to 23.

Next, the task launcher 35 determines whether a task is present in the wait queue 34 (step S22). If no task is present in the wait queue 34 (step S22: NO), the task launcher 35 waits for a task to be stored in the wait queue 34. If a task is present in the wait queue 34 or if a task is stored to the empty wait queue 34 (step S22: YES), the task launcher 35 fetches from the wait queue 34, the task first stored to the wait queue 34 and deletes the fetched task from the wait queue 34 (step S23).

Next, the task launcher 35 determines whether the task fetched from the wait queue 34 has tag information and whether an allocation processor is specified by the tag information (step S24). The tag information is acquired in advance by a profiler or a simulator at the design stage of an application program for example. The tag information is described in the application program for example and is stored in a memory (not depicted) housed in the processor #0_21 acting as a master.

If an allocation processor is specified (step S24: YES), the task launcher 35 activates the task on the processor specified by the tag information (step S25), and the procedure returns to step S22.

On the other hand, if no allocation processor is specified (step S24: NO), the task launcher 35 refers to the acceptance flag 38 of F0 corresponding to the master processor #0_21 and the acceptance flags (F'1 and F'2) 37 corresponding to the slave processors 22 and 23 (#1 and #2), to determine whether a processor is present in which the acceptance flag of F0, F'1, or F'2 is set (step S26). If no processor is present in which the acceptance flag of F0, F'1, or F'2 is set (step S26: NO), the task launcher 35 waits for the setting of the acceptance flag of F0, F'1, or F'2.

If a processor is present in which the acceptance flag of F0, F'1, or F'2 is set or if the unset acceptance flag of F0, F'1, or F'2 is set (step S26: YES), the task launcher 35 activates a task on a processor having the acceptance flag of F0, F'1, or F'2 set therein (step S27), and the procedure returns to step S22. When a task is activated, plural flags among the acceptance flags of F0, F'1, and F'2 may be set. In such a case, the task launcher 35 selects one processor based on a predetermined rule and activates a task on the selected processor. The rule for selecting one processor may be for example selecting a processor having a lower processor number or selecting a processor having a processor number that is a remainder obtained by dividing a generated random number by the number of the processors.

After returning to step S22 from step S25 or S27, the task launcher 35 repeats the steps S22 to S27. If no task remains that is executed on the processors (#0, #1, and #2) 21 to 23, the series of task activation processes depicted in FIG. 5 comes to an end.

Figure 6:
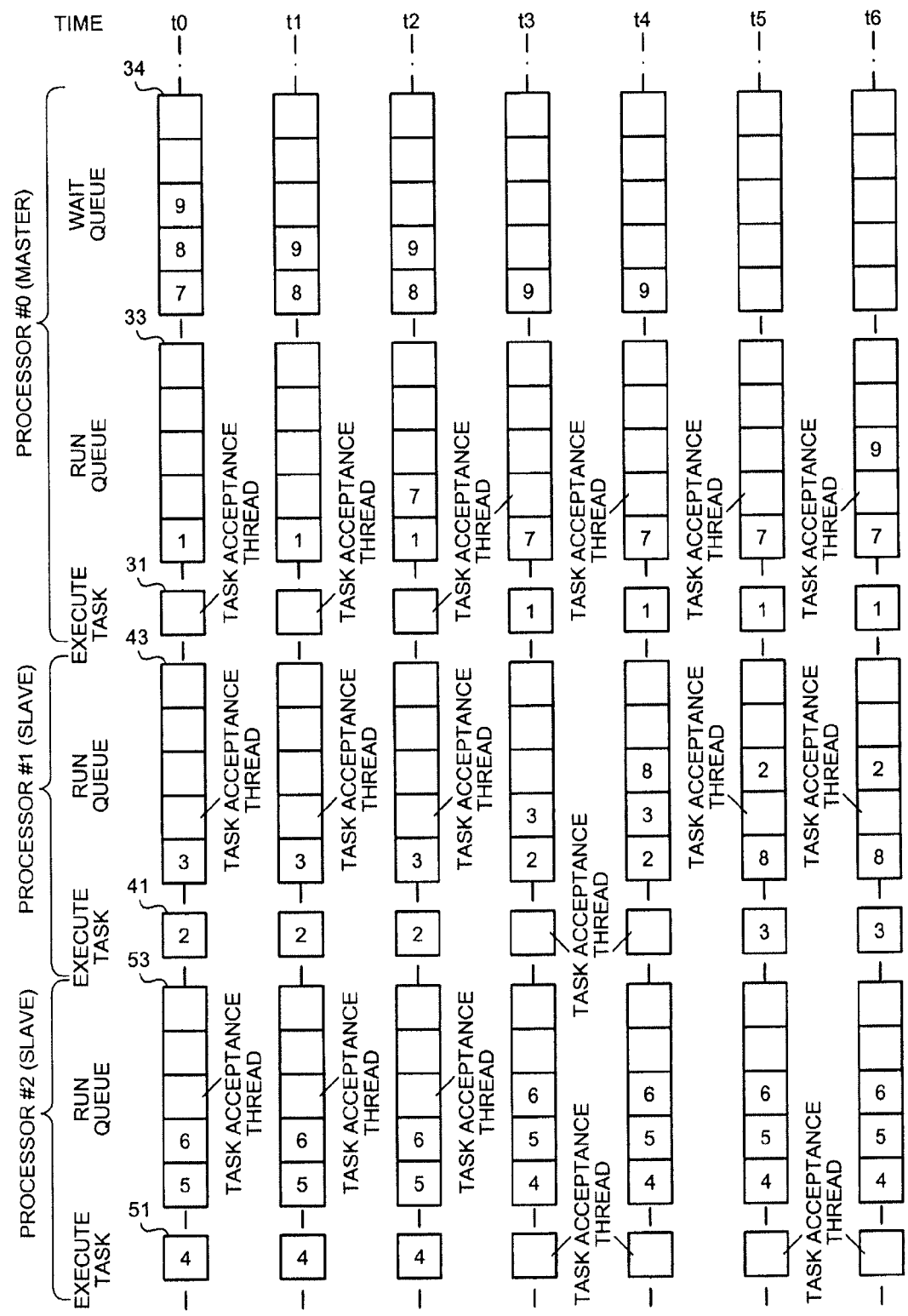
FIG. 6 is an explanatory diagram of an example of task activation by the scheduling method according to the second embodiment.

An example of operation of the processors (#0, #1, and #2) 21 to 23 upon task activation will be described. FIG. 6 is an explanatory diagram of an example of task activation by the scheduling method according to the second embodiment. As depicted in FIG. 6, the scheduling processing is started by the task launcher 35 of the processor #0_21 acting as a master and the states of the processors (#0, #1, and #2) 21 to 23 at a given time t0 are as follows.

State at Time t0: A task acceptance thread is dispatched as the execute task 31 in the processor #0_21. An acceptance flag F0_38 of the processor #0_21 is set by the task acceptance thread in the processor #0_21. A task #1 is stored to the run queue 33 of the processor #0_21.

A task #2 is dispatched as the execute task 41 in the processor #1_22. A task #3 and a task acceptance thread are stored in this order in the run queue 43 of the processor #1_22 while resumption of execution by the task switch is awaited.

A task #4 is dispatched as the execute task 51 in the processor #2_23. Tasks #5 and #6 and a task acceptance thread are stored in this order in the run queue 53 of the processor #2_23 while resumption of execution by the task switch is awaited.

Tasks #7, #8, and #9 are stored in this order in the wait queue 34 while allocation to the processor is awaited. The tasks #7 and #8 have no tag information. The task #9 has tag information specifying the processor #0_21 as an allocation processor.

State at Time t1 after Time t0: The task launcher 35 fetches from the wait queue 34, the task #7 at the head of the queue and deletes the task #7 from the wait queue 34. The task launcher 35 checks whether the fetched task #7 has tag information. Since no tag information is appended to the task #7, the task launcher 35 checks the states of the acceptance flags 37 and 38 of F0, F'1, and F'2 corresponding to the processors (#0, #1, and #2) 21 to 23.

State at Time t2 after Time t1: Since the acceptance flag 38 of F0 corresponding to the processor #0_21 is set, the task launcher 35 activates the task #7 on the processor #0_21. As a result, the task #7 is stored at the end of the run queue 33 of the processor #0_21, so that the tasks #1 and #7 are stored in this order in the run queue 33 while resumption of execution by the task switch is awaited. In the processor #0_21, the acceptance flag F0_38 is cleared at the time of completion of the dispatch of the task acceptance thread.

State at Time t3 after Time t2: The task #1 stored at the head of the run queue 33 is dispatched as the execute task 31 in the processor #0_23. The task #7 and a task acceptance thread are stored in this order in the run queue 33 of the processor #0_21 while resumption of execution by the task switch is awaited.

In the processor #1_22, the execution of tasks #2 and #3 has been completed and a task acceptance thread is dispatched as the execute task 41. The acceptance flag F1_45 of the processor #1_22 is set by the task acceptance thread in the processor #1_22. As a result, the acceptance flag 37 of F'1 of the processor #0_21 corresponding to the processor #1_22 is set by the snoop controller 24. The tasks #2 and #3 are stored in this order in the run queue 43 of the processor #1_22 while resumption of execution by the task switch is awaited.

In the processor #2_23, the execution of tasks #4, #5, and #6 has been completed and a task acceptance thread is dispatched as the execute task 51. The acceptance flag F2_55 of the processor #2_23 is set by the task acceptance thread in the processor #2_23. As a result, the acceptance flag 37 of F'2 of the processor #0_21 corresponding to the processor #2_23 is set by the snoop controller 24. The tasks #4, #5, and #6 are stored in this order in the run queue 53 of the processor #2_23 while resumption of execution by the task switch is awaited.

The task launcher 35 fetches the task #8 at the head of the queue from the wait queue 34 and deletes the task #8 from the wait queue 34. The task launcher 35 checks whether the fetched task #8 has tag information. Since no tag information is appended to the task #8, the task launcher 35 checks the state of the acceptance flag 38 of F0 corresponding to the master processor #0_21 and the states of the acceptance flags 37 of F'1 and F'2 corresponding to the salve processors (#1 and #2) 22 and 23.

State at Time t4 after Time t3: In the case where plural flags are set among the acceptance flag 38 of F0 corresponding to the master processor #0_21 and the acceptance flags 37 of F'1 and F'2 corresponding to the slave processors (#2 and #3) 22 and 23, the task launcher 35 activates a task on the processor having the lower processor number for example. In this case, the task launcher activates the task #8 on the processor #1_22 having the lower processor number among the processor #1_22 and the processor #2_23. As a result, the task #8 is stored at the end of the run queue 43 of the processor #1_22, so that the tasks #2, #3, and #8 are stored in this order in the run queue 43 while resumption of execution by the task switch is awaited.

At the time of completion of the dispatch of the task acceptance thread, the acceptance flags F1_45 and F2_55 are cleared in the processors #1_22 and #2_23, respectively. As a result, the states of acceptance flags 37 of F'1 of the processor #0_21 corresponding to the processor #1_22 and of F'2 of the processor #0_21 corresponding to the processor #2_23 are cleared by the snoop controller 24.

State at Time t5 after Time t4: The task #1 is dispatched as the execute task 31 in the processor #0_21. The task #7 and the task acceptance thread are stored in this order in the run queue 33 of the processor #0_21 while resumption of execution by the task switch is awaited.

In the processor #1_22, the execution of the task acceptance thread and the task #2 has been completed and the task #3 is dispatched as the execute task 41. The task #8, the task acceptance thread, and the task #2 are stored in this order in the run queue 43 of the processor #1_22 while resumption of execution by the task switch is awaited.

In the processor #2_23, the execution of the tasks #4, #5, and #6 has been completed and a task acceptance thread is dispatched as the execute task 51. The acceptance flag F2_55 of the processor #2_23 is set by the task acceptance thread in the processor #2_23. As a result, the acceptance flag 37 of F'2 of the processor #0_21 corresponding to the processor #2_23 is set by the snoop controller 24. The tasks #4, #5, and #6 are stored in this order in the run queue 53 of the processor #2_23 while resumption of execution by the task switch is awaited.

The task launcher 35 fetches the task #9 at the head of the queue from the wait queue 34 and deletes the task #9 from the wait queue 34. The task launcher 35 checks whether the fetched task #9 has tag information. Tag information is appended to the task #9 and specifies the processor #0_21 as an allocation processor.

State at Time t6 after Time t5: The task launcher 35 activates the task #9 on the processor #0_21 based on the tag information of the task #9. As a result, the task #9 is stored at the end of the run queue 33 of the processor #0_21, so that the task #7, the task acceptance thread, and the task #9 are stored in this order in the run queue 33 while waiting for the assumption of execution by the task switch.

According to the slave processor 2 of the second embodiment, substantially the same effects as those of the first embodiment can be obtained and similarly for a case of a single slave processor or three or more slave processors. Although in the first and second embodiments a system having plural microprocessors has been described as an example of the multiprocessor system, the present invention is similarly applicable to a multi-core system incorporating plural processor cores in a single microprocessor. In the case of applying the present invention to the multi-core system, the processor in the above description is replaced by the processor core. The multiprocessor system and scheduling method according to the first and second embodiments are applicable to an apparatus having an embedded system, e.g. a cellular phone.

According to the disclosed multiprocessor system and scheduling method, drops in throughput can be suppressed in the multiprocessor system.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A multiprocessor system comprising:
    a master processor having a first flag, a state of the first flag indicating whether the master processor is in a task activation accepting state and a second flag reflective of a state of a third flag of at least one slave processor, the master processor iteratively updating the state of the first flag at a frequency based on a volume of tasks processed by the master processor, the master processor activating a task on the master processor based on the state of the first flag and a task on the at least one slave processor based on the state of the second flag without using interprocessor communication;
    the at least one slave processor having the third flag, a state of the third flag indicating whether the at least one slave processor is in a task activation accepting state, the slave processor iteratively updating the state of the third flag at a frequency based on a volume of tasks processed by the at least one slave processor, the tasks being allocated to the slave processor by the master processor; and
    a synchronization unit that synchronizes the state of the third flag and the state of the second flag.

2. The multiprocessor system according to claim 1, wherein
    the first flag and the second flag are stored in a cache of the master processor,
    the third flag is stored in a cache of the at least one slave processor, and
    the synchronization unit includes a snoop controller that controls coherency among the second flag and the third flag in the caches.

3. The multiprocessor system according to claim 1, wherein
    in the master processor, a task acceptance thread updating the state of the first flag is dispatched at a frequency based on the volume of tasks processed by the master processor, and in the at least one slave processor, another task acceptance thread updating the state of the third flag is dispatched at a frequency based on the volume of tasks processed by the at least one slave processor.

4. The multiprocessor system according to claim 3, wherein the task acceptance threads of the master processor and the at least one slave processor, after dispatch, cause the master processor and the at least one slave processor to respectively change the states of the first flag and the third flag from a task activation non-accepting state to the task activation accepting state and to respectively return the states to the task activation non-accepting state before completion of the dispatch.

5. The multiprocessor system according to claim 4, wherein the master processor activates on the master processor, a task whose activation processor is not specified in advance and when the state of the first flag is the task activation accepting state, activates the task on the at least one slave processor when the state of the third flag reflected on the second flag is the task activation accepting state, and activates the task on the master processor or the at least one slave processor when the state of the first flag is the task activation accepting state and the state of the third flag reflected on the second flag is the task activation accepting state.

6. A scheduling method comprising:

iteratively updating by a master processor and at a frequency based on a volume of tasks processed by the master processor, a state of a first flag indicating whether the master processor is in a task activation accepting state;

iteratively updating by at least one slave processor and at a frequency based on a volume of tasks processed by the at least one slave processor, a state of a third flag indicating whether the slave processor is in a task activation accepting state;

synchronizing the state of the third flag and the state of a second flag in the master processor; and activating by the master processor, a task on the master processor based on the state of the first flag and a task on the at least one slave processor based on the state of the second flag without using inter-processor communication.

7. The scheduling method according to claim 6, comprising:

dispatching in the master processor and at a frequency based on the volume of tasks processed by the master processor, a task acceptance thread updating the state of the first flag; and dispatching in the at least one slave processor and at a frequency based on the volume of tasks processed by the at least one slave processor, a task acceptance thread updating the state of the third flag.

8. The scheduling method according to claim 7 comprising executing the task acceptance threads of the master processor and the at least one slave processor to cause the master processor and the at least one slave processor to respectively change, after dispatch, the states of the first flag and the third flag from a task activation non-accepting state to the task activation accepting state and to return the states to the task activation non-accepting state before completion of the dispatch.

9. The scheduling method according to claim 8 comprising activating on the master processor and by the master processor, a task whose activation processor is not specified in advance and when the state of the first flag is the task activation accepting state, activating the task on the slave processor when the state of the third flag reflected on the second flag is the task activation accepting state, and activating the task on the master processor or the at least one slave processor when the state of the first flag is the task activation accepting state and the state of the third flag reflected on the second flag is the task activation accepting state.

* * * * *